8892X
J. WARING.
Refrigerator.
Patented June 12, 1835.
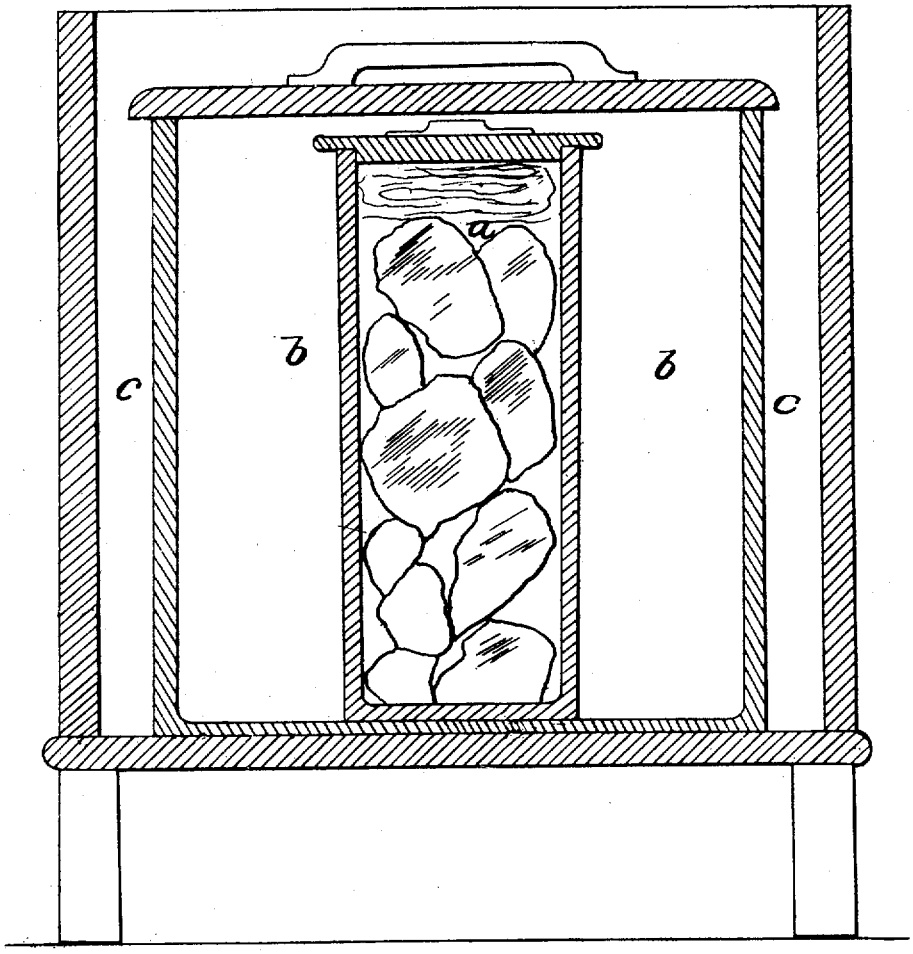

427

Patented June 12, 1835 95

8892X

John Waring of Port Tobago Virginia
Letters Patent.

The Schedule referred to in these Letters Patent and making part of the same containing a description in the words of the said John Waring himself of his improvement in an apparatus for cooling Water and other liquids called Warings Refrigerator.

Be it Known that I John Waring of Port Tobago, Caroline County, Virginia, have made an improvement in the useful arts, being an apparatus for cooling water, and other liquids, called Warings Refrigerator which is described as follows. This apparatus consists of an earthen vessel about 19 inches high 8 inches wide at top & 7 1/2 in at bottom, to be filled with ice, having a cover fitted closely — an outer vessel about 20 in. by 20 in. containing the inner vessel with water, having a cover which not only covers the outer but also the inner vessel, these two vessels are inserted into a chest or box about 26 inches by 24 inches, and 24 inches deep or high. The space between the larger vessel and the box or chest is filled with charcoal, coming immediately in contact with it. This nest of vessels may be inserted into a press, furnished with shelves, or any other piece of furniture suitable to be placed in a parlour, or any other part of the house, forming an ornamental piece of furniture.

Operation.

The earthen vessel being filled with ice, and the space between this and the second vessel filled with water, and the vacancy between the larger vessel, and the chest or box filled with char coal, and the meat, butter, or any other food placed on plates &c in the shelves, the whole is preserved perfectly cool, & sweet & by means of a cock, which projects from the second vessel, cool water may be drawn at pleasure. —

What I claim as my invention and desire to be secured

[illegible]

96 8692X by Letters Patent, consists in the arrangements and adaptation of the several parts of the apparatus for cooling water and other fluids as before described.

For a further illustration of my invention I refer to the model and drawing of the same, deposited in the Patent Office Witnesses John Waring Clement T. Goode S. Alfred Elliot

X 8

Exa 442. Patented June 12. 1835.